United States Patent
Kesse et al.

(10) Patent No.: US 8,121,774 B2
(45) Date of Patent: Feb. 21, 2012

(54) EXHAUST GAS RECIRCULATION SYSTEM AND METHOD OF OPERATING SUCH SYSTEM

(75) Inventors: Mary Lou Kesse, Peoria, IL (US); Cory A. Brown, Peoria, IL (US); Adwait V. Joshi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 575 days.

(21) Appl. No.: 12/366,687

(22) Filed: Feb. 6, 2009

(65) Prior Publication Data

US 2010/0199959 A1    Aug. 12, 2010

(51) Int. Cl.
*F02M 25/07* (2006.01)
*F02B 47/08* (2006.01)
*F02B 33/44* (2006.01)
*G06F 19/00* (2011.01)

(52) U.S. Cl. ... 701/108; 123/435; 123/677; 123/568.12; 123/568.21; 60/605.2

(58) Field of Classification Search .................. 123/435, 123/672, 676–678, 568.11, 568.12, 568.21, 123/568.22; 701/102, 103, 108, 111, 114, 701/115; 60/605.2
See application file for complete search history.

(56) References Cited

U.S. PATENT DOCUMENTS

| | | | |
|---|---|---|---|
| 6,062,204 A | 5/2000 | Cullen | |
| 6,647,972 B2 * | 11/2003 | Sato et al. | 123/568.22 |
| 6,725,848 B2 | 4/2004 | Ramamurthy et al. | |
| 7,292,929 B2 * | 11/2007 | Durand | 701/108 |
| 7,597,093 B2 * | 10/2009 | Totten et al. | 123/677 |
| 2002/0053343 A1 | 5/2002 | Sato et al. | |
| 2004/0050373 A1 | 3/2004 | Gao et al. | |

FOREIGN PATENT DOCUMENTS

WO    WO 2007113014 A1 *    10/2007    ................... 701/108
* cited by examiner

*Primary Examiner* — Willis Wolfe, Jr.

(57) ABSTRACT

An exhaust gas recirculation (EGR) system for an engine and a method of operating that system is disclosed. The system has a conduit arrangement for conducting exhaust gas from an exhaust side of the engine to an intake side of the engine, a valve arrangement configured for controlling the amount of exhaust gas to be recirculated and a conduit arrangement for providing intake air to the intake side of the engine. A sensor arrangement is provided and is configured to sense at least one parameter indicative of the humidity of the recirculated exhaust gas and the intake air at the intake side of the engine. A control arrangement is configured to receive a signal from the first sensor arrangement and further is configured to control the valve arrangement in response to a determination by the control arrangement that the first parameter is outside a desired range for low-$NO_x$ emission during a subsequent combustion period.

20 Claims, 2 Drawing Sheets

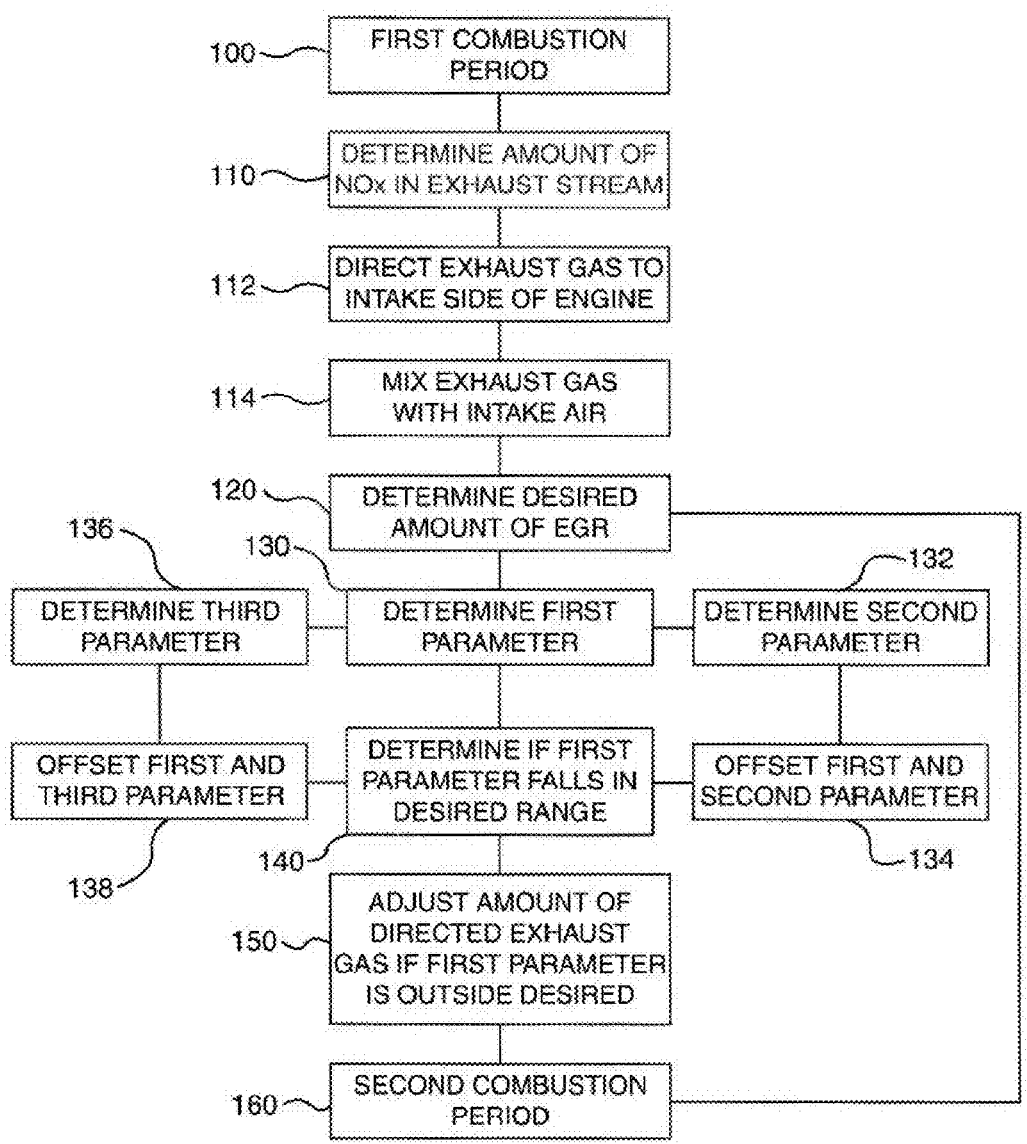

EXHAUST GAS RECIRCULATION SYSTEM AND METHOD OF OPERATING SUCH SYSTEM

TECHNICAL FIELD

This disclosure relates to engine emission control and in particular, but not exclusively, to controlling exhaust gas recirculation (EGR) for internal combustion engines.

BACKGROUND

Exhaust gas recirculation (EGR) is a well known technique for reducing levels of harmful Nitrogen Oxides ($NO_x$) in emissions from combustion engines and internal combustion engines in particular. Controlling EGR to the right levels is important to achieve desirable emission levels of $NO_x$, but excessive EGR may negatively impact engine and/or emissions performance.

EGR control strategies tend to estimate EGR quantities and qualities and involve expensive EGR gas measurement arrangements such as that disclosed in U.S. Pat. No. 6,725,848. Such flow measurement arrangements tend to comprise a venturi for measuring the mass flow rates, but constituents, i.e. EGR quality, are calculated based on fuel system models. These models may not be accurate for all conditions and combining several estimation models and inputs can quickly lead to errors in calculating.

SUMMARY OF THE INVENTION

In a first aspect there is disclosed a method of operating an engine, comprising causing a first combustion period thereby creating exhaust gas and directing at least a portion of the exhaust gas to an intake side of the engine. At least a portion of the exhaust gas is mixed with intake air to create a mixture for a second combustion period. A first parameter indicative of the humidity of the mixture is determined and a further determination is made to determine if the first parameter is outside a desired range expected to promote a low-$NO_x$ emission from the second combustion period. The amount of exhaust gas directed to the intake side is based on at least the determination if the first parameter is outside the desired range.

In a further aspect there is disclosed an exhaust gas recirculation (EGR) system for an engine comprising a conduit arrangement for conducting exhaust gas from an exhaust side of the engine to an intake side of the engine and a valve arrangement configured for controlling the amount of exhaust gas to be recirculated. The system further comprises a conduit arrangement for providing intake air to the intake side of the engine and a sensor arrangement configured to sense at least one parameter indicative of the humidity of the recirculated exhaust gas and the intake air at the intake side of the engine. A control arrangement in the system is configured to receive a signal from the first sensor arrangement and further configured to control the valve arrangement in response to a determination by the control arrangement that the first parameter is outside a desired range for low-$NO_x$ emission during a subsequent combustion period.

In yet a further aspect there is disclosed an internal combustion engine comprising at least one cylinder, an intake manifold fluidly connectable to the cylinder, an exhaust manifold fluidly connectable to the cylinder and an exhaust gas recirculation (EGR) conduit configured to fluidly connect the intake manifold and the exhaust manifold. An exhaust gas recirculation valve is configured to control the amount of exhaust gas flowing through the exhaust gas recirculation conduit whilst a conduit is configured to supply intake air to the intake manifold. The internal combustion engine further comprises a mixing arrangement configured to mix intake air and recirculated exhaust gas and a sensor arrangement configured to sense at least one parameter indicative of the humidity of the mixture. A control arrangement in the internal combustion engine is configured to determine if the at least one parameter corresponds to a desired range for low $NO_x$ combustion events, the control arrangement further being configured to control the exhaust gas recirculation valve based on the at least one parameter.

Other features and aspects of this disclosure will be apparent from the following description and the accompanying drawings.

BRIEF DESCRIPTION OF THE DRAWINGS

FIG. 2 shows a flowchart representation of an exemplary method of operation of the current disclosure.

DETAILED DESCRIPTION

Figure 1:
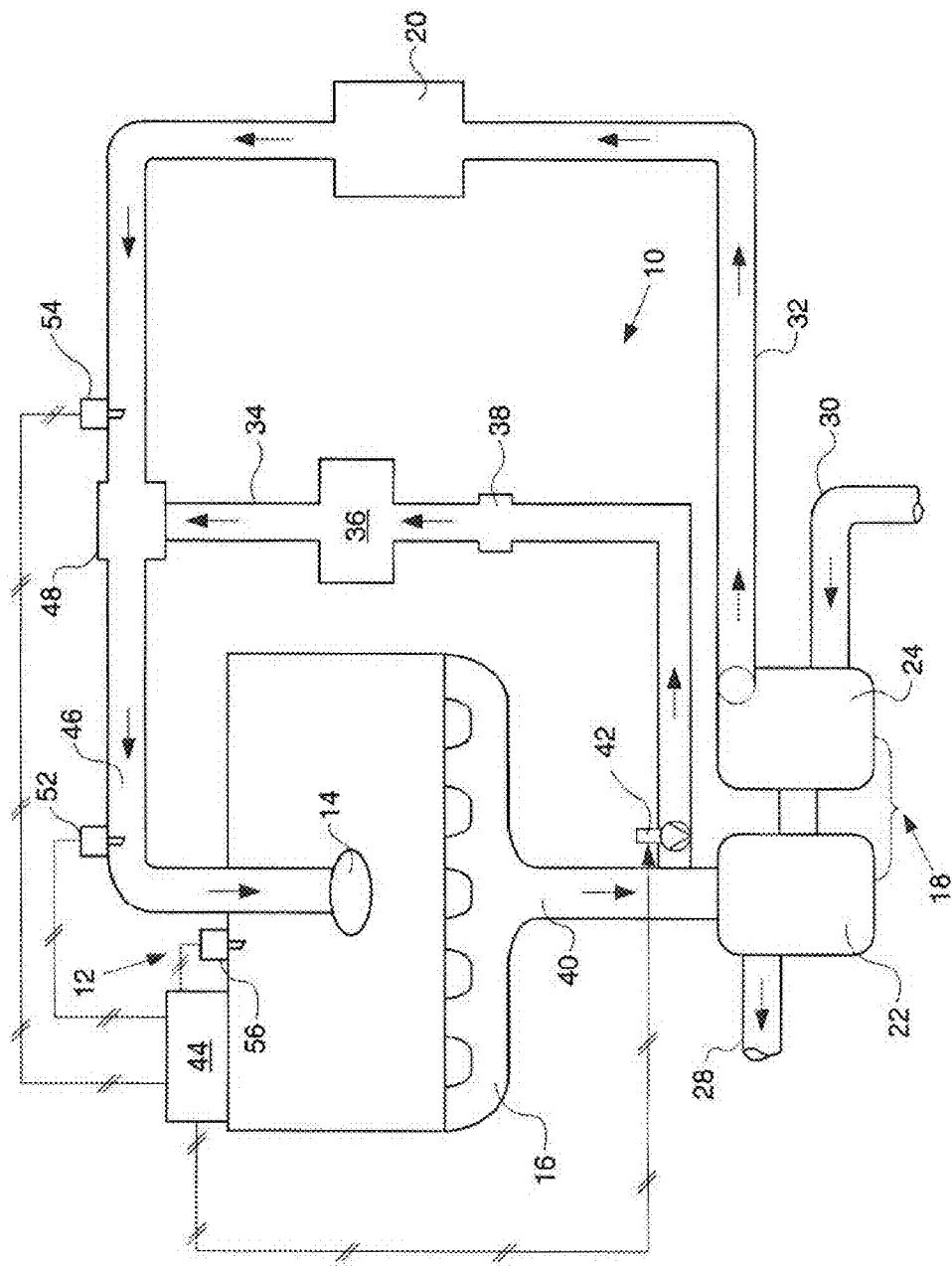
FIG. 1 shows a diagrammatical representation of an exemplary embodiment in accordance with the current disclosure.

Now referring to FIG. 1, there is shown an exemplary Exhaust Gas Recirculation (EGR) system 10 comprising an engine 12. The engine 12 may be any kind of suitable engine such as an internal combustion engine and in particular a diesel fuelled self-ignition (SI) internal combustion engine.

The engine 12 may comprise an intake manifold 14, an exhaust manifold 16, a turbocharger 18 and one or more conduit arrangements as will be elaborated on below. The turbocharger 18 may have an exhaust gas driven turbine 22 and exhaust gas may flow from the exhaust manifold 16 to the turbine 22 via exhaust conduit 40 and may leave the turbine 22 via conduit 28. The turbocharger 18 may further have an intake compressor 24 that may receive intake air via conduit 30 and pressurized intake air may leave the compressor 24 via conduit 32. Although not shown in FIG. 1 the turbocharger 18 may be regarded as being a turbocharging arrangement comprising multiple turbochargers 18 in for example a series configuration. The compressed intake air may be cooled via charge air cooler 20 before it arrives at intake manifold 14. It is to be understood that the turbocharger 18 and the charge air cooler 20 may not be present in certain configurations of engine 12. The emission of the engine 12 is commonly referred to as exhaust gas but may in reality be a mixture of gas, other fluids such as liquids, and even solids, comprising for example $CO_2$, $H_2O$, $NO_x$ and particulate matter. At least a portion of the exhaust gas may be recirculated to the intake manifold 14 via EGR conduit 34. This portion of the exhaust gas will for simplicity from now on be referred to as EGR gas. An EGR valve 42 is configured to be controlled by control arrangement 44 so as to vary the quantity of EGR gas. The EGR gas may be passed through a particulate trap 38 to reduce the amount of particulate matter in the EGR gas. The EGR gas may also be passed through an EGR cooler 36 to cool the EGR gas before it arrives at the intake manifold 14. The order of the particulate trap 38 and the EGR cooler 36 may be reversed such that the EGR cooler 36 is positioned upstream of the particulate trap 38.

The control arrangement 44 may be a single controller or comprise a plurality of independent or linked control units. The control arrangement 44 may be configured to receive and process signals from various sensor arrangement and may be further configured to determine the operating conditions of the engine 12 and or the EGR system 10. The control arrangement may further be provided with at least one of calculations, embedded plant models, tables and maps enabling the control arrangement 44 to relate various inputs to certain operating conditions. In some embodiments the control arrangement 44 may comprise data regarding estimated $NO_x$ output in relation to operating conditions such as for example engine speed, engine load, fuel consumption.

A mixing arrangement 48 is configured to mix the intake air from conduit 32 together with the EGR gas from EGR conduit 34 to create a mixture 50 having a desirable level of homogeneity. In some embodiments the mixing arrangement 48 may simply be the conduit 46 and/or the intake manifold 14. The conduit 46 and/or the intake manifold 14 may be provided with features such as for example vanes, valves, or labyrinths to increase the mixing characteristics if desired. In some embodiments a the mixing arrangement 48 may include a dedicated fluid mixer assembly.

The mixture of intake air and EGR gas may be conducted to the intake manifold 14 via conduit 46. Although shown as being remote from the intake manifold 14, it is to be understood that the mixing arrangement 48 may be more closely integrated with the intake manifold 14 than depicted in FIG. 1.

The exemplary embodiment in FIG. 1 is depicted as a high pressure loop EGR, i.e. the EGR gas is diverted from the general exhaust flow at a location somewhere upstream of the turbine 22. However, it is to be understood that the current disclosure is also suitable for low-pressure loop EGR or Clean Gas Induction Loop (CGI) configurations, i.e. those configurations wherein the EGR gas is diverted from the general exhaust flow at a location somewhere downstream of the turbine 22.

A first sensor arrangement 52 may be provided at a location downstream of the mixing arrangement 48. The first sensor arrangement 52 may comprise any sensor suitable for determining a first parameter indicative of the humidity of the mixture 50. In some embodiments the first sensor arrangement 52 may be configured to determine the relative humidity and/or the absolute humidity of the mixture 50. In some embodiments the sensor may be a commercially available sensor, such as for example the Trican HTD2800 P3B11C6 CA as marketed by the Humirel Corporation.

A second sensor arrangement 54 may be provided. The second sensor arrangement 54 may be positioned such that it is able to sense a characteristic of the intake air. It may for example be provided in conduit 32, either upstream or downstream of charge air cooler 20. In some embodiments the second sensor arrangement 54 is provided downstream of charge air cooler because the charge air cooler may affect the humidity of the intake air flowing across it and a humidity measurement upstream of the charge air cooler 20 may not be representative of the humidity of the intake air downstream of the charge air cooler 20. The second sensor arrangement 54 may be suitable for determining a second parameter indicative of the humidity of the intake air. In some embodiments the second sensor arrangement 54 may be configured to determine the relative humidity and/or the absolute humidity of the intake air. In some embodiments the sensor arrangement may comprise a commercially available sensor, such as for example the Trican HTD2800 P3B11C6 CA as marketed by the Humirel Corporation.

A third sensor arrangement 56 may be provided and may comprise a plurality of similar or different sensors that are capable of determining parameters indicative of operating conditions of the engine 12. The third sensor arrangement 56 may be positioned as preferred and may be spread over various portions of the EGR system 10 and the engine 12. In some embodiments the third sensor arrangement 56 may comprise a sensor capable of determining a parameter indicative of the level of $NO_x$ in the exhaust stream, such as for example a $NO_x$ sensor. In some embodiments the third sensor arrangement 56 may comprise one or a plurality of sensors capable of determining parameters related to the speed of and/or the load on the engine 12. In some embodiments the third sensor arrangement may comprise sensors capable of determining parameters indicative of combustion temperatures and/or combustion pressures. In some embodiments the third sensor arrangement may comprise sensors capable of indicating the amount of intake air being provided. This may for example be achieved by measuring at least one of intake air pressure, intake air flow, and a turbocharger parameter such as turbocharger speed.

At least some portions of the first, second and third sensor arrangements 52, 54 and 56, may be combined into common components if preferred. Either one, some or all of the first, second and third sensor arrangements 52, 54 and 56 may be in communication with the control arrangement 44.

INDUSTRIAL APPLICABILITY

An exemplary operation of the EGR system 10 will now be described in more detail. Fuel and air may be combusted in the engine 12, thereby creating exhaust gas. It is to be understood that the term exhaust gas for the purposes of this disclosure is not limited to those products in gaseous forms as such, but may also comprise other liquids or even solids such as particulate matter. During normal operation the majority of the exhaust gas tends to be in the form of $CO_2$ and $H_2O$ plus a minority of other constituents such as $NO_x$. Certain levels of $NO_x$ may be undesirable and one way of reducing $NO_x$ is to introduce at least a portion of the exhaust gas, especially the inert constituents such as the $CO_2$, into future combustion periods.

In a high pressure loop EGR system as shown in FIG. 1 the turbocharger 18 may create a backpressure such that the exhaust gas pressure in exhaust conduit 40 may be higher than the exhaust gas pressure in the EGR conduit 34. Opening the EGR valve 42 will allow exhaust gas to flow from the exhaust conduit 40 into the EGR conduit 34. At least partially opening and closing the EGR valve 42 may therefore enable more or less exhaust gas to pass through the EGR valve 42 into the EGR conduit 34. The control arrangement 44 may signal the EGR valve 42 to assume a desired position which may be for example fully open, fully closed or any of a range of intermediate positions. Exhaust gas flowing through the EGR conduit 34 may be mixed with intake air in mixing arrangement 48 to form the mixture 50.

Referring to the flow chart in FIG. 2, a first combustion period may take place in step 100 thereby producing exhaust gas. EGR valve 42 may be set in a first position diverting a first amount of exhaust gas to the conduit 46 to form the mixture 50.

In some embodiments a step 110 may comprise estimating the amount of $NO_x$ in the exhaust stream. In some embodiments control arrangement 44 may use data from the third sensor arrangement 56, such as for example data indicative of the amount of $NO_x$ in the exhaust stream. In some embodiments step 110 may comprise using data indicative of at least one of engine speed, engine load, combustion pressure and combustion temperature and may in combination with a previously stored map or table determine, which may comprise estimating, the amount of $NO_x$ in the exhaust stream.

In some embodiments a step 112 may comprise directing exhaust to an intake side of the engine 12, i.e. recirculating exhaust gas.

In some embodiments a step 114 may comprise mixing the EGR gas with intake air to form the mixture 50.

In some embodiments a step 120 may comprise the control arrangement 44 may determine a desired amount of EGR gas based on operating conditions of the engine 12. Both the terms "amount" and "composition" may in this context be interpreted as a single value or as a range of values. A desired amount in this context may be interpreted as that amount of EGR gas that is expected to create a mixture 50 that has a desired composition for promoting low-$NO_x$ combustion. Although the term "desired amounts" in first instance refers to the amount of exhaust gas itself, it may be interpreted as a desired amount of a particular constituent of the exhaust gas. The desired amount may for example be interpreted as the desired amount of one or more inert constituents such as $CO_2$. With the exemplary EGR valve 42 the amount of $CO_2$ as such can not be controlled directly, but it may be controlled indirectly by controlling the amount of EGR gas containing the $CO_2$.

In step 130 the first sensor arrangement 52 may determine the first parameter indicative of the humidity of the mixture 50 and may transmit a signal corresponding to the measurement to the control arrangement 44. The humidity of the mixture 50 is indicative of the amount of EGR gas in the mixture 50. For example, in some embodiments the engine 12 may be run on diesel fuel consisting of many compounds. An exemplary standard diesel composition may be represented by an estimate composition of $(CH_{1.85})_n$ whereby $n \approx 11$. In this embodiment a complete combustion would approximately produce a ratio of $CO_2$ to $H_2O$ of 1:1.85. After determining the parameter indicative of the humidity of the mixture 50 the amount of $CO_2$ in the mixture 50 and/or the amount of EGR gas itself can then be estimated/calculated if desired.

In some embodiments a step 132 may comprise using data from the second sensor arrangement 54. This data may be indicative of the humidity of the intake air at least a portion of which may be used to form the mixture 50. The humidity level of the intake air may influence the measurement taken by the first sensor arrangement 52, but this can be offset in step 134 using the data from the second sensor arrangement 54.

In step 140 the control arrangement 44 may determine, which may comprise estimating, if the first parameter falls in a desired range expected to promote low-$NO_x$ emission from a second combustion period. Determining if the first parameter falls in the desired range may be done in several ways. In some embodiments step 140 may comprise directly comparing the first parameter to a stored map or table comprising data regarding desired first parameter ranges for certain engine operating conditions. In some embodiments step 140 may comprise using the first parameter to estimate/calculate the amount of $CO_2$ in the mixture 50 and/or the amount of EGR gas itself and subsequently comparing the amount of EGR gas to the desired amount of EGR gas.

In some embodiments a step 150 may comprise controlling the EGR valve 42 based on the determination of step 140 so as to maintain, increase or decrease the amount of EGR gas for the second combustion period of step 160. For example a high humidity level of the mixture 50 may indicate too much EGR is taking place and the control arrangement 44 may signal the EGR valve 42 to at least partially close so as to decrease the amount of EGR. Similarly, a low humidity level of the mixture 50 may indicate too little EGR is taking place and the control arrangement 44 may signal the EGR valve 42 to at least partially open so as to increase the amount of EGR.

From step 160, the process may then loop back to step 110 in anticipation of further combustion periods.

In some embodiments a step 136 may comprise using data from the third sensor arrangement 56. This data may be indicative of the at least one of the level of $NO_x$ in the exhaust stream, the speed of and/or the load on the engine 12, combustion temperatures and/or combustion pressures or the amount of intake air being provided. Any of the aforementioned may affect how accurate the determination in step 140 is, but this can be offset in step 138 using the data from the third sensor arrangement 54.

It is to be understood that the work flow of steps as shown in FIG. 2 is merely exemplary as in other embodiments several of the steps may possibly be skipped, performed parallel to other steps or in reversed order.

Although the preferred embodiments of this invention have been described herein, improvements and modifications may be incorporated without departing from the scope of the following claims.

What is claimed is:

1. A method of operating an engine, comprising:
 causing a first combustion period thereby creating exhaust gas;
 directing at least a portion of the exhaust gas to an intake side of the engine;
 mixing said at least a portion of exhaust gas with intake air to create a mixture for a second combustion period;
 determining a first parameter indicative of the humidity of said mixture;
 determining if said first parameter is outside a desired range expected to promote a low-$NO_x$ emission from said second combustion period;
 adjusting the amount of exhaust gas directed to said intake side based on at least the determination if said first parameter is outside the desired range.

2. A method according to claim 1, further comprising determining a parameter indicative of the relative humidity of the mixture.

3. A method according to claim 1, wherein adjusting the amount of exhaust gas directed to said intake side includes increasing the amount of exhaust gas to be directed to said intake side if said first parameter is below the desired range.

4. A method according to claim 1, wherein adjusting the amount of exhaust gas directed to said intake side includes decreasing the amount of exhaust gas to be directed to said intake side if said first parameter is above the desired range.

5. A method according to claim 1, wherein determining if said first parameter is outside a desired range includes estimating if the level of $CO_2$ in said mixture is at a desired level.

6. A method according to claim 1, further comprising determining a second parameter indicative of the humidity of the intake air and controlling the amount of exhaust gas being mixed with the intake air based on at least said first and second parameters.

7. A method according to claim 6, further comprising offsetting said first parameter with said second parameter.

8. A method according to claim 1, further comprising determining a third parameter indicative of an operating condition of the engine and controlling the amount of exhaust gas being mixed with the intake air based on at least said first and third parameters.

9. A method according to claim 8, wherein determining the third parameter comprises determining the $NO_x$ level in the exhaust stream from the engine.

10. A method according to claim 8, wherein determining the third parameter comprises determining at least one parameter indicative of at least one of a combustion pressure, a combustion temperature, an engine speed an engine load and an intake air quantity.

11. An exhaust gas recirculation (EGR) system for an engine comprising:
- a conduit arrangement for conducting exhaust gas from an exhaust side of the engine to an intake side of the engine;
- a valve arrangement configured for controlling the amount of exhaust gas to be recirculated;
- a conduit arrangement for providing intake air to the intake side of the engine;
- a sensor arrangement configured to sense at least one parameter indicative of the humidity of the recirculated exhaust gas and the intake air at the intake side of the engine;
- a control arrangement configured to receive a signal from said first sensor arrangement and further configured to control said valve arrangement in response to a determination by said control arrangement that said first parameter is outside a desired range for low-$NO_x$ emission during a subsequent combustion period.

12. A system according to claim 11, further comprising a sensor arrangement configured to determine a parameter indicative of the humidity of the intake air.

13. A system according to claim 11, wherein the sensor arrangement is configured to sense at least one parameter indicative of the relative humidity of the recirculated exhaust gas and the intake air.

14. A system according to claim 11, further comprising a sensor arrangement configured to determine at least one parameter indicative of at least one of a combustion pressure, a combustion temperature, an engine speed an engine load and an intake air quantity.

15. A system according to claim 11, wherein the sensor arrangement configured to sense at least one parameter indicative of the humidity of the recirculated exhaust gas and the intake air is positioned downstream of a mixing arrangement.

16. A system according to claim 11, wherein the sensor arrangement configured to sense at least one parameter indicative of the humidity of the recirculated exhaust gas and the intake air is further configured to sense at least one parameter indicative of the temperature of the mixture.

17. An internal combustion engine comprising:
- at least one cylinder;
- an intake manifold fluidly connectable to said cylinder;
- an exhaust manifold fluidly connectable to said cylinder;
- an exhaust gas recirculation (EGR) conduit configured to fluidly connect said intake manifold and said exhaust manifold;
- an exhaust gas recirculation valve configure to control the amount of exhaust gas flowing through the exhaust gas recirculation conduit;
- a conduit configured to supply intake air to said intake manifold a mixing arrangement configured to mix intake air and recirculated exhaust gas;
- a sensor arrangement configured to sense at least one parameter indicative of the humidity of the mixture;
- a control arrangement configured to determine if said at least one parameter corresponds to a desired range for low $NO_x$ combustion events, said control arrangement further configured to control said exhaust gas recirculation valve based on said at least one parameter.

18. An internal combustion engine according to claim 17, further comprising a turbocharger in fluid connection with said exhaust manifold, whereby said exhaust gas recirculation conduit is fluidly connected to said exhaust manifold in a position upstream of said turbocharger.

19. An internal combustion engine according to claim 17, further comprising an EGR cooler in said EGR conduit.

20. An internal combustion engine according to claim 17, further comprising a particulate trap in said EGR conduit.

* * * * *